(12) United States Patent
Opalinski

(10) Patent No.: US 12,545,384 B2
(45) Date of Patent: Feb. 10, 2026

(54) HUBLESS PROPULSION UNIT

(71) Applicant: Everon Corporation, Orlando, FL (US)

(72) Inventor: Lukasz Opalinski, Orlando, FL (US)

(73) Assignee: Everon Corporation, Orlando, FL (US)

( * ) Notice: Subject to any disclaimer, the term of this patent is extended or adjusted under 35 U.S.C. 154(b) by 539 days.

(21) Appl. No.: 17/933,370

(22) Filed: Sep. 19, 2022

(65) Prior Publication Data

US 2023/0012160 A1   Jan. 12, 2023

Related U.S. Application Data

(63) Continuation of application No. PCT/US2021/023330, filed on Mar. 19, 2021.

(60) Provisional application No. 62/991,870, filed on Mar. 19, 2020.

(51) Int. Cl.
| | |
|---|---|
| *B63H 1/16* | (2006.01) |
| *B60F 3/00* | (2006.01) |
| *B64C 11/00* | (2006.01) |
| *B64C 37/00* | (2006.01) |
| *B63H 23/00* | (2006.01) |

(52) U.S. Cl.
CPC .............. *B63H 1/16* (2013.01); *B60F 3/0007* (2013.01); *B64C 11/001* (2013.01); *B64C 37/00* (2013.01); *B63H 2001/165* (2013.01); *B63H 2023/005* (2013.01)

(58) Field of Classification Search
CPC ................ B63H 1/16; B63H 2001/165; B63H 2023/005; B60F 3/0007; B60F 5/003; B60F 5/02; B64C 11/001; B64C 37/00; B64C 11/02; B60B 19/00; B64D 27/30
See application file for complete search history.

(56) References Cited

U.S. PATENT DOCUMENTS

| | | |
|---|---|---|
| 2,966,317 A | 12/1960 | Ramniceann |
| 4,505,346 A | 3/1985 | Mueller |
| 6,517,026 B1 | 2/2003 | Smith |
| (Continued) | | |

FOREIGN PATENT DOCUMENTS

| | | |
|---|---|---|
| AU | 2013273446 B2 | 10/2017 |
| CA | 2875745 A1 | 12/2013 |
| (Continued) | | |

OTHER PUBLICATIONS

Jonathan Andrea, "Dual Rim Driven Propeller-Wheel", May 2019, researchgate.com (Year: 2019).*

(Continued)

*Primary Examiner* — Valentina Xavier
(74) *Attorney, Agent, or Firm* — Greenberg Traurig, LLP; Roman Fayerberg; Joshua I. Rudawitz

(57) ABSTRACT

The propulsion unit including a casing having an inner curved surface and an outer curved surface, at least one tire disposed within the casing within a duct defined by the inner curved surface and the outer curved surface, a first propeller and a second propeller having a plurality of blades extending from within the casing toward a center axis of the casing, and one or more motors housed within the casing, the one or motor being configured to operate the at least one tire, the first propeller, and the second propeller independently of one another. There is also provided a vehicle with one or more propulsion units of the present disclosure.

30 Claims, 10 Drawing Sheets

(56) References Cited

U.S. PATENT DOCUMENTS

| | | | |
|---|---|---|---|
| 7,472,863 | B2 | 1/2009 | Pak |
| 7,959,104 | B2 | 6/2011 | Kuntz |
| 8,376,263 | B2 | 2/2013 | Eames |
| 8,794,564 | B2 | 8/2014 | Hutson |
| 8,794,566 | B2 | 8/2014 | Hutson |
| 8,827,200 | B2 | 9/2014 | Radu |
| 8,991,740 | B2 | 3/2015 | Olm et al. |
| 9,045,226 | B2 | 6/2015 | Piasecki et al. |
| 9,145,207 | B2 | 9/2015 | Moschetta et al. |
| 9,364,766 | B2 | 6/2016 | Mielniczek |
| 9,393,847 | B2 | 7/2016 | Piasecki et al. |
| 9,610,817 | B1 | 4/2017 | Piasecki et al. |
| 9,630,710 | B2 | 4/2017 | Hutson |
| 9,688,400 | B2 | 6/2017 | Hutson |
| 9,776,715 | B2 | 10/2017 | Zhou et al. |
| 9,789,415 | B2 | 10/2017 | Mielniczek |
| 9,944,389 | B2 | 4/2018 | Piasecki et al. |
| 10,081,424 | B2 | 9/2018 | Radu |
| 10,124,891 | B2 | 11/2018 | Chang et al. |
| 10,189,565 | B2 | 1/2019 | Patterson et al. |
| 10,745,125 | B2 | 8/2020 | Kondo |
| 12,025,149 | B2 * | 7/2024 | Ogasawara ........... F04D 29/522 |
| 2005/0247819 | A1 | 11/2005 | Caruso |
| 2008/0048065 | A1 | 2/2008 | Kuntz |
| 2009/0145107 | A1 | 6/2009 | Nicholson |
| 2009/0186535 | A1 | 7/2009 | Sullivan |
| 2009/0293795 | A1 | 12/2009 | Schröder |
| 2010/0181414 | A1 | 7/2010 | Lopez, Jr. |
| 2012/0024216 | A1 | 2/2012 | Schroder |
| 2014/0061362 | A1 | 3/2014 | Olm et al. |
| 2016/0176514 | A1 | 6/2016 | Lavagen et al. |
| 2016/0207368 | A1 | 7/2016 | Gaonjur |
| 2017/0029103 | A1 | 2/2017 | Chang et al. |
| 2017/0073070 | A1 | 3/2017 | Xing |
| 2017/0210468 | A1 | 7/2017 | Jacob et al. |
| 2017/0300051 | A1 | 10/2017 | Zhou et al. |
| 2018/0029431 | A1 | 2/2018 | Tang et al. |
| 2018/0056743 | A1 | 3/2018 | Zhou et al. |
| 2019/0393763 | A1 * | 12/2019 | Menheere ........... F04D 25/0606 |
| 2020/0172234 | A1 * | 6/2020 | Neff ................ B64C 37/00 |

FOREIGN PATENT DOCUMENTS

| | | |
|---|---|---|
| CN | 103459250 A | 12/2013 |
| CN | 103522855 A | 1/2014 |
| CN | 104369635 A | 2/2015 |
| CN | 204172626 U | 2/2015 |
| CN | 10438586 A | 3/2015 |
| CN | 104470601 A | 3/2015 |
| CN | 104859392 A | 8/2015 |
| CN | 103213466 B | 12/2015 |
| CN | 105291737 A | 2/2016 |
| CN | 105329056 A | 2/2016 |
| CN | 105711824 A | 6/2016 |
| CN | 104470601 B | 11/2016 |
| CN | 106114099 A | 11/2016 |
| CN | 106143870 A | 11/2016 |
| CN | 106155080 A | 11/2016 |
| CN | 106240262 A | 12/2016 |
| CN | 106347049 A | 1/2017 |
| CN | 206012247 U | 3/2017 |
| CN | 206186713 U | 5/2017 |
| CN | 206277908 U | 6/2017 |
| CN | 107054636 A | 8/2017 |
| CN | 107215158 A | 9/2017 |
| CN | 104369635 B | 11/2017 |
| CN | 206733947 U | 12/2017 |
| CN | 107719652 A | 2/2018 |
| EP | 1810735 A1 | 7/2007 |
| EP | 3037349 A1 | 6/2016 |
| EP | 2691299 B1 | 7/2016 |
| EP | 2858730 B1 | 8/2016 |
| EP | 3335935 A1 | 6/2018 |
| FR | 3030451 A1 | 6/2016 |
| FR | 3031461 A1 * | 7/2016 | ........... A63H 33/003 |
| IN | 2014 | 7/2014 |
| IN | 201941051143 A | 12/2019 |
| JP | H06343799 A | 6/1993 |
| JP | 2015123918 A | 7/2015 |
| JP | 2015523933 A | 8/2015 |
| JP | 5837032 B2 | 12/2015 |
| JP | 5902338 B1 | 4/2016 |
| JP | 2016120907 A | 7/2016 |
| JP | 2016222216 A | 12/2016 |
| JP | 6343799 B2 | 6/2018 |
| JP | 6425323 B1 | 11/2018 |
| KR | 20170092068 A | 2/2016 |
| KR | 20180007196 A | 7/2016 |
| KR | 20160093242 A | 8/2016 |
| KR | 20160122096 A | 10/2016 |
| KR | 20170054896 A | 5/2017 |
| KR | 101747593 B1 | 6/2017 |
| KR | 101453598 B1 | 7/2017 |
| KR | 20170078573 A | 7/2017 |
| KR | 101775922 B1 | 9/2017 |
| KR | 101778618 B1 | 9/2017 |
| KR | 101795877 B1 | 11/2017 |
| KR | 101806040 B1 | 12/2017 |
| KR | 101837585 B1 | 3/2018 |
| KR | 101845416 B1 | 4/2018 |
| KR | 20180127868 A | 11/2018 |
| KR | 20180127869 A | 11/2018 |
| RS | 55498 B1 | 5/2017 |
| RU | 2013144664 A | 5/2015 |
| TW | 1610850 B | 1/2018 |
| WO | WO-0244006 A1 | 6/2002 |
| WO | WO-2011146349 A2 | 11/2011 |
| WO | WO-2012102898 A1 | 8/2012 |
| WO | WO-2012130856 A1 | 10/2012 |
| WO | WO-2013182708 A1 | 12/2013 |
| WO | WO-2014062275 A2 | 4/2014 |
| WO | WO-2014062276 A2 | 4/2014 |
| WO | WO-2015149000 A1 | 10/2015 |
| WO | WO-2016069167 A1 | 5/2016 |
| WO | WO-2016069169 A1 | 5/2016 |
| WO | WO-2017126820 A1 | 7/2017 |
| WO | WO-2018056501 A1 | 3/2018 |
| WO | WO-2018122842 A2 | 7/2018 |
| WO | WO-2018154592 A1 | 8/2018 |
| WO | WO-2018213836 A1 | 11/2018 |
| WO | WO-2018216825 A1 | 11/2018 |
| WO | WO-2019021521 A1 | 1/2019 |
| WO | 2019060933 A1 | 4/2019 |

OTHER PUBLICATIONS

Extended European Search Report in EP 21 79 3236 mailed Apr. 4, 2024.
International Search Report; PCT/US2021/023330; Dated: Dec. 14, 2021; by: Authorized officer Shane Thomas.

* cited by examiner

HUBLESS PROPULSION UNIT

CROSS-REFERENCE TO RELATED APPLICATION(S)

This application is a continuation to PCT Application No. PCT/US21/23330, filed on Mar. 19, 2021, and claims priority to, and the benefit of, U.S. Provisional Application No. 62/991,870, filed Mar. 19, 2020. The disclosures of both applications are hereby incorporated by reference in their entireties.

FIELD OF THE INVENTION

The present disclosure relates to a hubless propulsion unit that is suitable for generating a propulsion force on a vehicle. In particular, the present disclosure relates to a hubless propulsion unit capable of propelling a vehicle from a vertical orientation while on a surface and propelling a vehicle from a horizontal or tilted orientation while suspended in air or water.

BACKGROUND

Generally, wheels, propellers, and thrusters are designed around a central axis or hub. The hub is traditionally both the coupling point and power transfer mechanism for the wheel, propeller, or thruster. For example, in automobiles, watercrafts, and aircrafts, the wheel, propeller, or thruster are typically attached to some sort of axle, which is also attached to a power source, such as an engine. The engine can apply a rotational force to the axle, directly or indirectly, which in turn will apply a rotational force to the wheel, propeller, or thruster attached to the opposing end of the axle. This rotational force will cause the wheel, propeller, or thruster to turn to provide movement to the vehicle.

Hubless wheel designs can include wheels without a central hub that are rotated using a combination of chain or belt drives. Current hubless wheel designs, however, have many disadvantages and can be difficult and expensive to manufacture due to the need for precision machining and the necessity to leave bearings and other critical parts largely exposed to the elements.

SUMMARY

There is a need for improvements for wheel, propeller, and thruster designs, specifically hubless wheel, propeller, and thruster designs. The present disclosure is directed toward further solutions to address this need, in addition to having other desirable characteristics.

In accordance with example embodiments of the present disclosure, a propulsion unit is provided. The propulsion unit including a casing having an inner curved surface and an outer curved surface, at least one tire disposed within the casing within a duct defined by the inner curved surface and the outer curved surface, a first propeller and a second propeller having a plurality of blades extending from within the casing toward a center axis of the casing, and one or more motors housed within the casing, the one or motor being configured to operate the at least one tire, the first propeller, and the second propeller independently of one another.

In accordance with aspects of the present invention, one or more motors includes a first motor having a first stator fixedly attached to the casing, a first rotor positioned around an outer circumference of the first stator, and the tire being coupled to the first rotor. The one or more motors can include a second motor having a second stator fixedly attached to the casing, a second rotor positioned within an inner circumference of the second stator, and a first set of the plurality of blades being coupled to the second rotor for the first propeller. The one or more motors can include a third motor having a third stator fixedly attached to the casing, a third rotor positioned within an inner circumference of the third stator, and a second set of the plurality of blades being coupled to the third rotor for the second propeller. The casing can be configured to receive an electrical current and provide the electrical current to the first stator, the second stator, and the third stator to provide movement of the at least one tire, the first propeller, and the second propeller, respectively.

In accordance with aspects of the present invention, the first motor further include a plurality of electromagnets to provide assisted braking for the tire. The casing can further include at least one runner gap for allowing the plurality of blades to protrude from within the casing. The first motor with the tire can be configured for propelling a vehicle on a surface. The second motor with the first propeller and the third motor with the second propeller can be configured for propelling a vehicle in the air. The first propeller and the second propeller can be configured to rotate in opposite directions.

In accordance with example embodiments of the present invention, propulsion unit is provided. The propulsion unit includes a first rotor coupled to a plurality of blades extending toward a center axis of the first rotor, a second rotor a coupled to a tire, at least one stator designed to cause rotation of the first rotor or the second rotor, and a casing for housing the first rotor, the second rotor, and the at least one stator.

In accordance with aspects of the present invention, the at least one stator being moveable between a first location to cause rotation of the first rotor and a second location to cause rotation of the second rotor. The at least one stator can be designed to removable attach to the casing at the first location or the second location. The propulsion unit can further include a third rotor coupled to a second plurality of blades extending toward a center axis of the third rotor. The casing can further include at least one runner gap for allowing at least one blade of the plurality of blades to protrude from within the casing. The second rotor can further include a plurality of electromagnets to provide assisted braking for the tire.

In accordance with example embodiments of the present invention, vehicle is provided. The vehicle includes a chassis for receiving a passenger and a propulsion unit. The propulsion unit includes a casing having an inner curved surface and an outer curved surface, at least one tire disposed within the casing within a duct defined by the inner curved surface and the outer curved surface, a first propeller and a second propeller having a plurality of blades extending from within the casing toward a center axis of the casing, and one or more motors housed within the casing, the one or motor being configured to operate the at least one tire, the first propeller, and the second propeller independently of one another.

In accordance with aspects of the present invention, one or more motors comprises a first motor having a first stator fixedly attached to the casing, a first rotor positioned around an outer circumference of the first stator, and the tire being coupled to the first rotor. The one or more motors can include a second motor having a second stator fixedly attached to the casing, a second rotor positioned within an inner circumference of the second stator, and a first set of the plurality of blades being coupled to the second rotor for the first propeller. The one or more motors can include a third motor having a third stator fixedly attached to the casing, a third rotor positioned within an inner circumference of the third stator, and a second set of the plurality of blades being coupled to the third rotor for the second propeller. The casing can be configured to receive an electrical current and provide the electrical current to the first stator, the second stator, and the third stator to provide movement of the at least one tire, the first propeller, and the second propeller, respectively.

In accordance with aspects of the present invention, the first motor further include a plurality of electromagnets to provide assisted braking for the tire. The casing can further include at least one runner gap for allowing the plurality of blades to protrude from within the casing. The first motor with the tire can be configured for propelling a vehicle on a surface. The second motor with the first propeller and the third motor with the second propeller can be configured for propelling a vehicle in the air. The first propeller and the second propeller can be configured to rotate in opposite directions.

BRIEF DESCRIPTION OF THE FIGURES

These and other characteristics of the present disclosure will be more fully understood by reference to the following detailed description in conjunction with the attached drawings, in which.

DETAILED DESCRIPTION

Figure 1A:
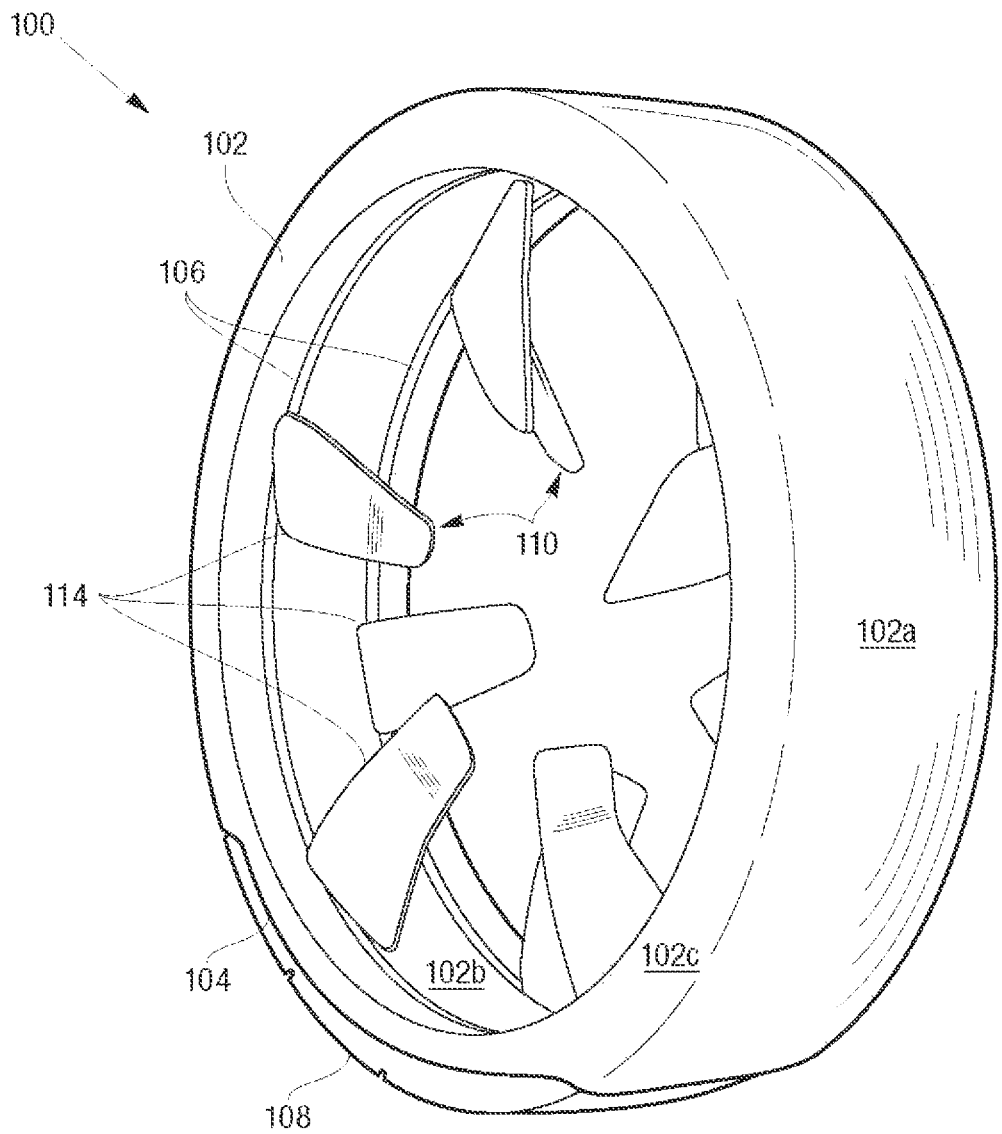
FIG. 1A is an isometric view of an example embodiment for a propulsion unit, in accordance with the present disclosure.

A hubless propulsion unit design that is suitable for generating a propulsion force on a vehicle. In particular, the present disclosure relates to a hubless propulsion unit capable of propelling a vehicle from a vertical orientation while sitting on a surface and propelling a vehicle from a horizontal or tilted orientation while suspended in air or water.

The design of the present disclosure provides a unique combination of mechanical systems with functionally separate moving components to create an independent self-contained propulsion unit. The propulsion unit can include a tire that can be individually powered by its own electric motor built into a housing, a first hubless propeller or thruster powered by rim driven electric motor, and a second hubless propeller or thruster powered by rim driven electric motor. In some embodiments, the first hubless propeller and the second hubless propeller can be designed to rotate in different directions (e.g., counter rotation). Having the different mechanical systems, the propulsion unit can change between different operation modes. For example, an illustrative embodiment of the present disclosure relates to a propulsion unit specifically designed to be used for operating on plurality of surfaces, such as paved roads, dirt roads, sand, gravel, grass, etc. as well as a vehicle suspended in air or water. The propulsion unit can be configured with both a wheel/tire for operation in a drive mode as well as a thruster for flight mode, which are independent from all other components of the vehicle, enabling the power distribution as well as turnability of the propulsion unit to be entirely de-centralized. In some embodiments, motors combined for operation of the different propellers and tires.

The propulsion unit of the present disclosure can be hubless in design and is internally powered from a decentralized energy source or powerplant. The decentralized energy source has the ability to include individually powered wheels, propellers, and/or thrusters built into an inclusive casing/duct/rim. With this configuration, individual propulsion units within a vehicle can be independently operated, controller, maintained, etc. without directly effecting the operation of other units. In some embodiments, due to the fact that all moving, and powering mechanisms are resolved internally there is no need for hub, axle, clutches, gearboxes, etc. that are relied upon by conventional wheel, propeller, and thruster designs.

FIGS. 1A through 6B, wherein like parts are designated by like reference numerals throughout, illustrate an example embodiment or embodiments of improved operation for a hubless wheel, propeller, thruster design, according to the present disclosure. Although the present disclosure will be described with reference to the example embodiment or embodiments illustrated in the figures, it should be understood that many alternative forms can embody the present disclosure. One of skill in the art will additionally appreciate different ways to alter the parameters of the embodiment(s) disclosed, such as the size, shape, or type of elements or materials, in a manner still in keeping with the spirit and scope of the present disclosure.

Figure 1B:
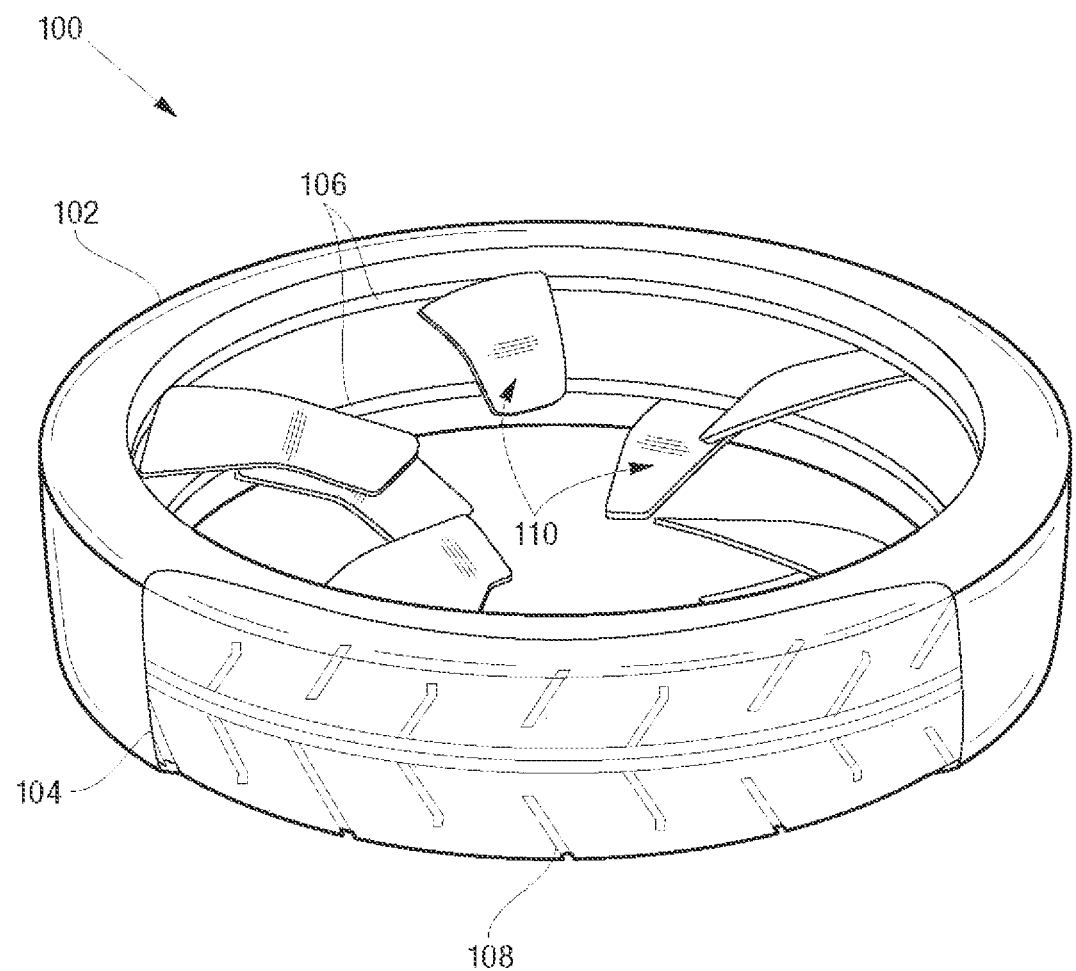
FIG. 1B is an isometric bottom view of an example embodiment for a propulsion unit, in accordance with the present disclosure.
Figure 1C:
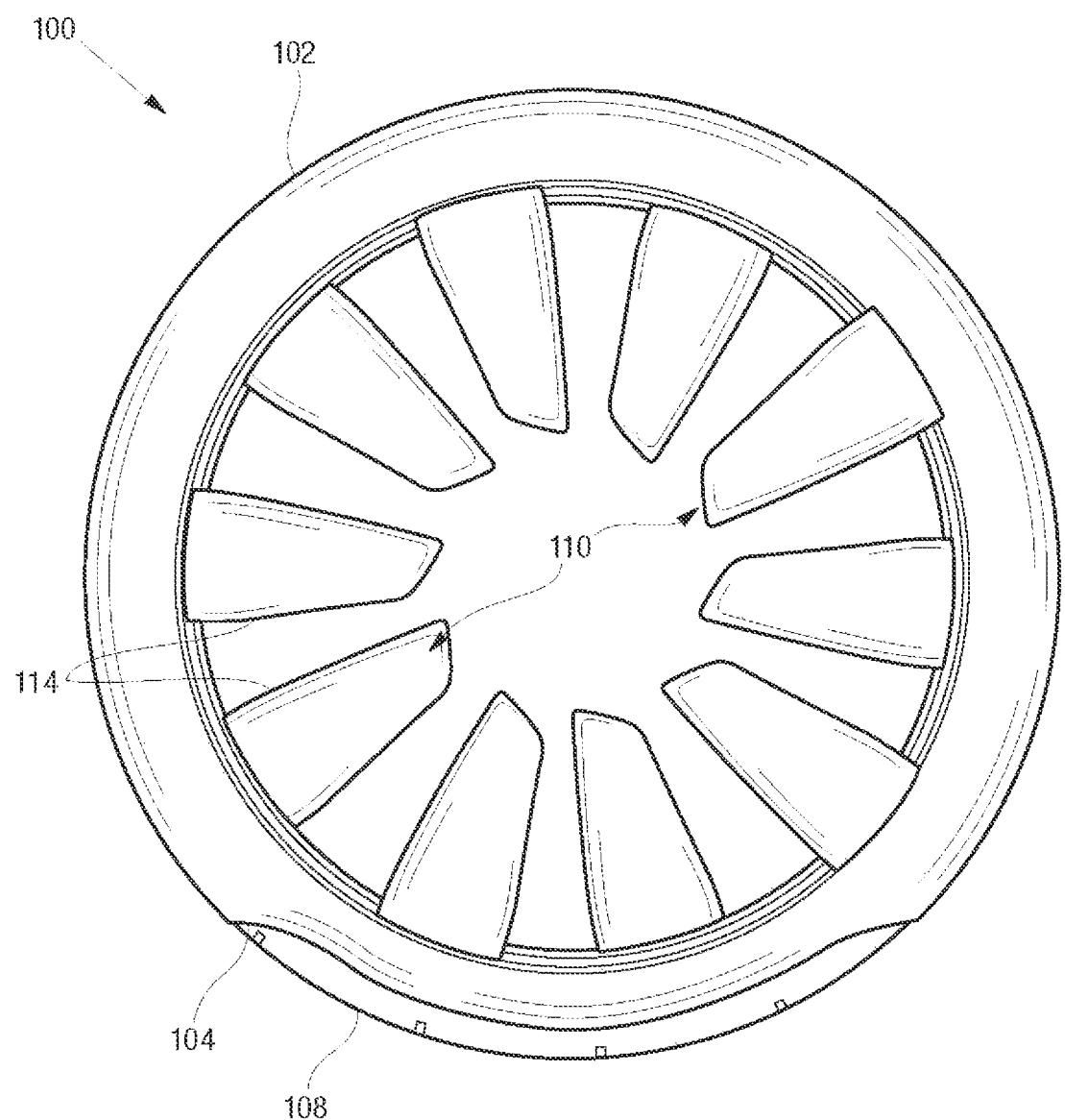
FIG. 1C is a side view of an example embodiment for a propulsion unit, in accordance with the present disclosure.

Referring to FIGS. 1A-1C, exemplary embodiments of a propulsion unit 100 (or duct), in accordance with the present disclosure, are depicted. The propulsion unit 100 can be designed to provide a self-contained propulsion unit that is able to operate without a hub or axial connection. The propulsion unit 100 can include a combination of a power source, a mechanism for imparting motion, and one or more rotational mechanisms for receiving the motion to cause propulsion. For example, the propulsion unit 100 can include a battery energy source connected to one or more motors that drive a combination of wheels or propellers. The propulsion unit 100 can implement any combination of power sources, motors, etc. known in the art, such as for example, a combustion engine. FIG. 1A depicts an isometric view of an embodiment of the propulsion unit 100 in a substantially vertical orientation, FIG. 1B depicts an isometric view of an embodiment of the propulsion unit 100 in a substantially horizontal orientation, and FIG. 1C depicts a side view of an embodiment of the propulsion unit 100 in a substantially vertical orientation. The propulsion unit 100 can be one of a plurality of propulsion units 100 coupled to a vehicle to supply mechanical forces to propel the vehicle, such as for example, the vehicle 700 depicted in FIGS. 7A and 7B and as discussed in U.S. application Ser. No. 17/174,660, incorporated herein in its entirety.

In some embodiments, the propulsion unit 100 can include a casing 102 for housing the various components of the propulsion unit 100. The casing 102 can provide protection for the components therein as well has providing structure elements to assist in the operation of those components. The casing 102 can include any combination of shapes and structures for housing the components. For example, the casing 102 can include an outer curved surface 102a, inner curved surface 102b, and sidewall surfaces 102c adjoining the inner curved surface 102b and the outer curved surface 102a to define the overall shape of the casing 102. In some embodiments, the casing 102 can be a substantially hollow casing with an opening in the middle, such as a duct. For example, the casing 102 can have cylindrical design with a central cutout defined by the inner curved surface, a torus design, or a combination thereof. In some embodiments, a first duct can be defined by the space between the inner curved surface 102b and the outer curved surface 102a and a second duct can be defined by the space within the inner curved surface 102b. As would be appreciated by one skilled in the art, the casing 102 can include any combination of shapes that enable enclosure of all the components discussed herein and imparting the function of the presentation disclosure.

In some embodiments, the components within the casing 102 of the propulsion unit 100 can include one or more energy sources (not depicted), one or more motors (rotors/stators), a tire 108, a first propeller 110a and a second propeller 110b, and a drive assembly 120. The casing 102 can be sized and dimensioned to contain each of the tire 108, the first propeller 110a and the second propeller 110b, and the drive assembly 120. The casing 102 can be designed to receive each of the components or to be constructed around the components. The casing 102 can also include openings, channels, slots, etc. to accommodate the various components and connections thereto. In some embodiments, the casing 102 can include a cutout 104, enabling at least a portion the tire 108, enclosed within the casing 102, to be exposed and to make contact with a road or other surface. In other words, the casing can have a cutout 104 such that it is not a full ring/cylindrical shape but more of a crescent moon shape such that at least a portion of the tire 108 will be exposed from within the casing 102. The location, size, and shape of the cutout 104 can be provided along a bottom end of the casing 102 such that, when the casing 102 is in a substantially vertical orientation, as depicted in FIGS. 1A and 1C, the tire 108 could make contact with a surface (i.e., road, ground, etc.). In some embodiments, the cutout 104 can be removed from the outer curved surface 102a of the casing 102 and/or at least a portion of the sidewall surfaces of the casing 102.

Continuing with FIGS. 1A-1C, the casing 102 can include an outer curved surface 102a and an inner curved surface 102b connected by a circular plane surface 102c connecting on both sides of the two curved surfaces 102a, 102b, as shown in FIG. 1A. In some embodiments, the casing 102 can include one or more runner gaps 106 cut out from the inner curved surface 102b of the casing 102. For example, the runner gaps 106 can be slots cut from and extend around the inner curved surface 102b, providing a channel for another component to travel within. For example, the runner gaps 106 can be configured to enable portions of one or more components within the casing 102 to extend from within the casing 102 and protrude therefrom. In some embodiments, the one or more runner gaps 106 can be sized and shaped such that blades 114 of the one or more propellers 110 can protrude from within the casing 102 and extend toward a central axis of the propulsion unit 100 (e.g., center point of the casing 102).

As utilized herein, the propellers 110 can include any combination of propellers, fan blades, thrusters, etc. The casing 102 can include any number of runner gaps 106, with each of the runner gaps 106 being configured to receive a single propeller 110 or a combination of propellers 110. For example, the casing 102 can include two runner gaps 106 running substantially parallel to one another within the inner curved surface 102b. In some embodiments, the casing 102 can include reinforcement to maintain an integrity level of the casing during the various operation states. For example, the middle surface 102c can be held by internal brackets connectors (e.g., connected to an outer ring 112a stator or other part). Although FIGS. 1A-1C show a design with two propellers 110a, 110b, any number of propellers 100 can be implemented without departing from the scope of the present disclosure. Similarly, any number of ties 102 can be used. In some embodiments, the propulsion unit 100 can be designed with just a tire(s) 108 or just propeller(s) 110.

Figure 2:
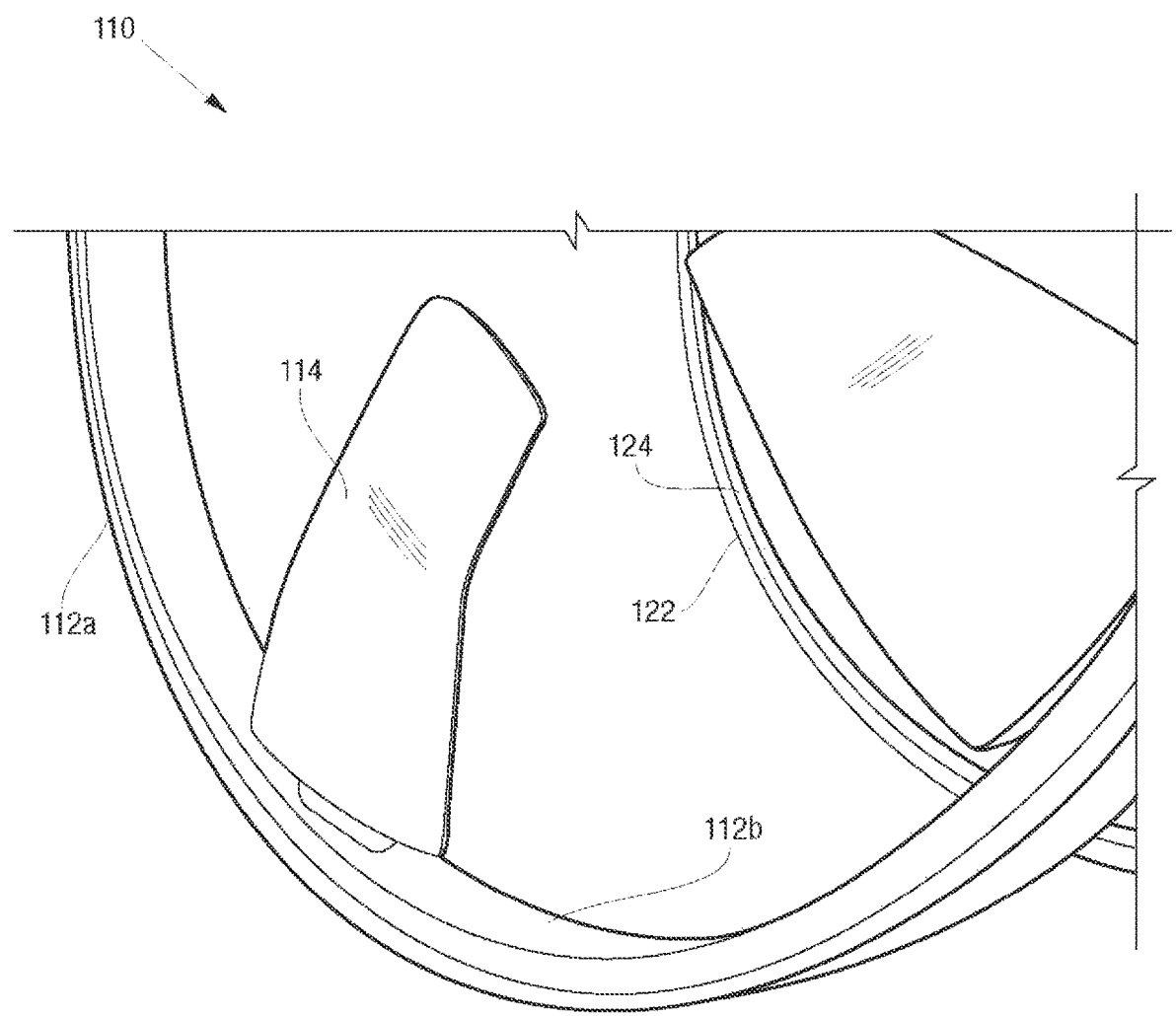
FIG. 2 is an isometric view of an example embodiment for a propeller blade for the propulsion unit, in accordance with the present disclosure.

Referring to FIG. 2, in some embodiments, the propellers 110 can be designed with a ring shape with a plurality of teeth, fins, or blades 114 coupled thereto. The blades 114 can be any combination of sizes and shapes to provide the desired effects, for example, generation of lift. The ring shape can include an outer ring 112a and an inner ring 112b. In some embodiments, the inner ring 112b can be attached or coupled to a rotational element (e.g., a rotor) within the casing 102 and the outer ring 112a can be a stationary stator mounted into the integral structure of the casing 102. In this configuration, the design can allow the inner ring 112b rotor part of the propellers 110 to rotate about the outer ring 112a stator part, in response to a force being applied by a rotor (e.g., via an electric motor). This will cause the blades 114 of the propeller 110 to rotate. In some embodiments, the runner gaps 106 within the casing 102 can be designed to allow each blade 114 of the propellers 110 to be connected with a rotor inside of the casing 102, such that as the rotor can cause the inner ring 112b to spin within the casing 102 while allowing the propellers 110 blades to rotate along with it.

The motor s provided in the present disclosure can include two basic electrical parts of the stator 112a (and rotor 112b and stator 124 and rotor 122 discussed later). The stator 112a can be the stationary electrical component having of a group of individual electro-magnets arranged such that they form a hollow cylinder, with one pole of each magnet facing toward the center of the group. The rotor 112b can be the rotating electrical component having a group of electro-magnets arranged around a cylinder, with the poles facing toward the stator poles. The objective of these motor components is to make the rotor 112b rotate which in turn will rotate the components attached thereto (e.g., blades 114, tire 108). This rotation will occur because of the magnetic phenomenon that unlike magnetic poles attract each other and like poles repel. Changing the polarity of the stator poles so that their combined magnetic field rotates will cause the rotor 112b to follow and rotate with the magnetic field of the stator 112a.

FIG. 2, shows a portion of a propeller 110 with the outer ring 112a and the inner ring rotor 112b having one of the blades 114 extending therefrom. In some embodiments, a plurality of blades 114 can be coupled to and/or extend from the inner ring 112b. The blades 114 can be coupled to the inner ring 112b using any combination of methods, for example, welding, bolding, single form manufacturing methods, etc. In some embodiments, the portion of the blade 114 that is connected to the inner ring 112b and/or can be sized and shaped for movement within the gaps 106 in the casing 102. The blades 114 can be located within the inner portion of the ring 112 extending toward a central point of the ring 112. Although five blades are depicted in each propeller 110 in the exemplary depictions provided herein, any combination of blades can be utilized without departing from the scope of the present disclosure. Similarly, the size and shape of the blades can vary and can be configured in a manner to most efficiently reduce drag during operation of the propulsion unit 100. In instances in which the propulsion unit 100 includes multiple propellers 110, each of the propellers 110 can have similar ring and/or blade design or a different combination of ring and/or blade designs.

Figure 4A:
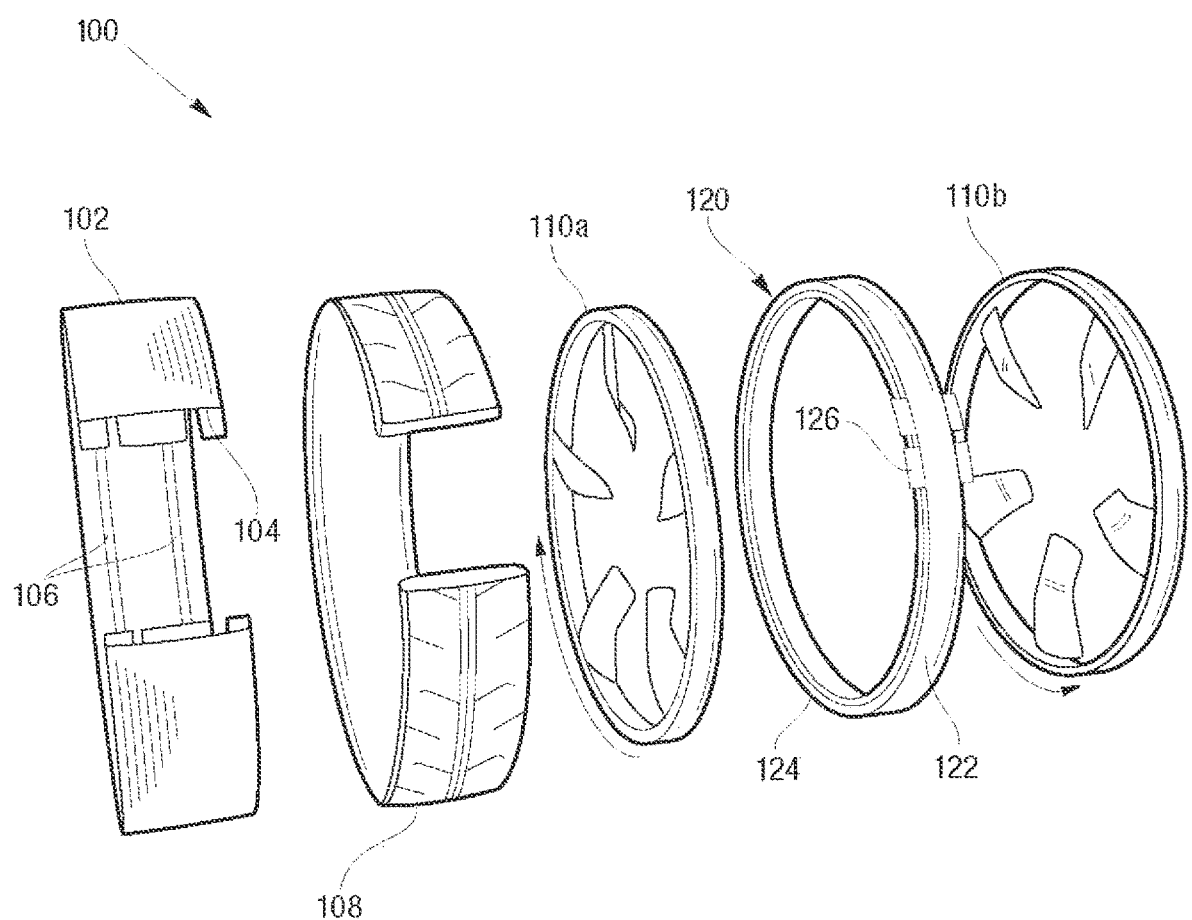
FIGS. 4A and 4B are exploded views of an example embodiment for a propulsion unit, in accordance with the present disclosure.
Figure 4B:
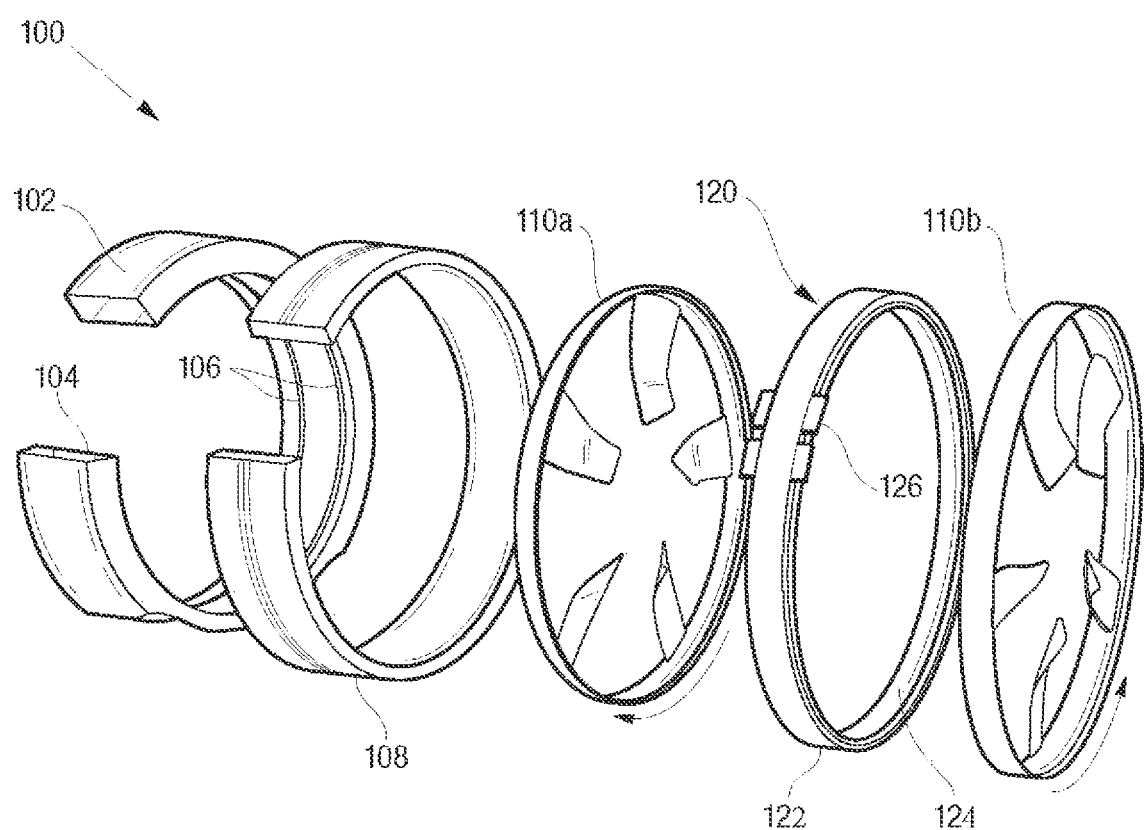

In some embodiments, the propulsion unit 100 can include multiple the propellers 110. The propulsion unit 100 can have multiple propellers in different locations within the casing 102 and/or can provide different rotational rates, directions, etc. For example, the propulsion unit 100 can include multiple counter acting propellers configured to receive power from and rotate freely within the casing 102. In some embodiments, as depicted, there can be two counter acting propellers 110 in each propulsion unit 100. Each of the propellers can include their own stator, rotor, and power source to provide independent control. For example, as shown in FIGS. 4A and 4B, a first propeller 110a can be configured for clockwise turning and a second propeller 110b can be configured for anti-clockwise turning. Alternatively, the first propeller 110a and the second propeller 110b can be configured to rotate in a same direction or can be configured to change rotation for different modes of operation/instances.

Continuing with FIG. 2, in some embodiments, the blades 114 of the propellers 110 can include blades mounted/coupled to the inner ring rotor 112b, which is designed to spin against the outer ring stator 112a. In this configuration, the inner ring 112b rotor with integrated blades 114 can rotate around the stationary outer ring 112a stator to create the function of the propellers 110. Each of the propellers 110 can include its own outer ring stator 112a and inner ring 112b rotor to provide independent movement for each propeller 110. In some embodiments, the propulsion unit 100 can include one or more stators 124 and corresponding to one or more rotors 122 to provide a different independent rotational unit for another component, for example, the tire(s) 108, as discussed in greater detail with respect to FIG. 3. The stators for the outer rings 112a of the propellers 110 and the stator(s) 124 for the tire(s) 108 can be coupled together and/or directed to the casing 102 to remain stationary regardless of the motion from the inner ring rotor 112b of the propellers 110 and the rotor(s) 122 for the tire(s) 108. For example, three rotations units (rotor/stator pairing) can be utilized, each including stator rotor pairings for powering the tire 108, a first propeller 110a and a second propeller 110b. In some embodiments, the casing 102 can include a plurality of bearings (not depicted) situated about the inner ring rotor 112b to assist in reduced friction for fluid rotation of the inner ring rotor 112b. The plurality of bearings can be part of the casing 102 and/or part of the stator/rotor combination.

In some embodiments, the spaces between the stators (112a, 124) and rotors (112b, 122) can include conductive material that can create motors that provide the electromagnetic forces to modify rotational movement of the propellers 100. For example, applying a current to the stators to create an electromagnetic field to create movement between rotors and stators. The amount of the current delivered to the conductive material can dictate the speed within which the rotor spins against the stator. The current can also be adjusted to slow or stop the rotation of the rotors. For example, opposite polarity of the magnets between the stators and rotors can accelerate braking of the rotors, when under electrical current. The motors can also be designed to perform regenerative braking while providing energy back to the energy source powering the motors. The amount of the current delivered to the magnets can also dictate the speed within which the rotor spins against the stator. The electrical current can be applied to conductive material via one or more of the power sources (e.g., batteries) powering the stator/rotor motors. For example, there can be a separate power source to send current to the conductive material for each of the propellers 110 to control speeds, direction, braking, etc.

Figure 3:
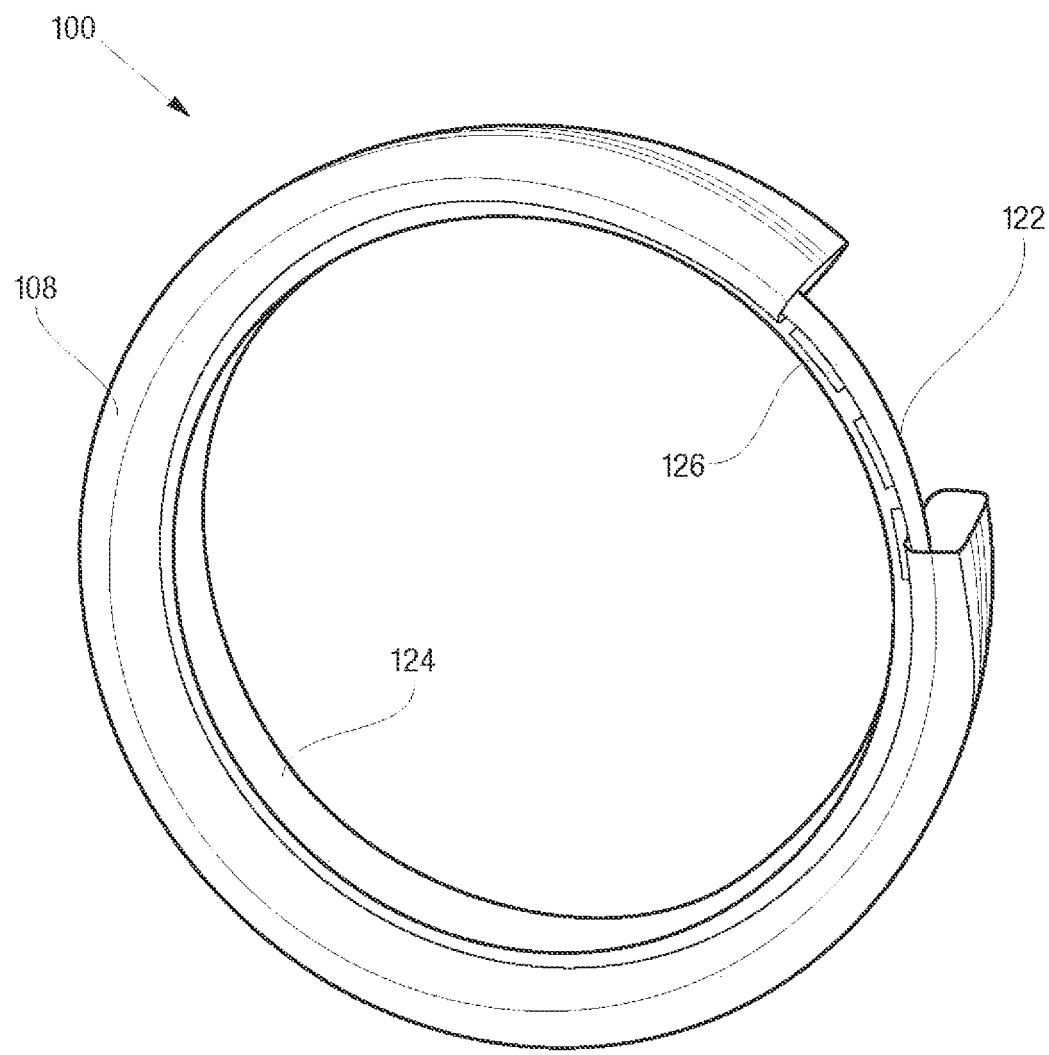
FIG. 3 is a side view of an example embodiment for a drive assembly for the propulsion unit, in accordance with the present disclosure.

Referring to FIG. 3, in some embodiments, the tires 108 can be coupled to a drive assembly 120 including a rotor 122 and a stator 124. For the drive assembly 120, the outer ring can be the rotor 122 which has a tire attached around its circumference. Otherwise, the rotor 122 and the stator 124 can be similar in design as the outer ring 112a stator and the inner ring 112b rotor or can be different in design. In some embodiments, the tire 108 can be part of the drive assembly 102 and can be mounted to the rotor 122 which spins against a stator 124. The tire 108 can run inside of the casing 102, spinning on its own runner bed. The runner bed can be a component including a groove configured to allow for constant alignment of the rotor 122 with the stator 124 to keep the rotor 122 spinning precisely and centered against the stator 124. The tire 108 can include any combination of tire shapes and structures known in the art. For example, the tire 108 can be made from rubber or similar material with treads designed to provide traction. The tire 108 can be a non-inflatable structural tire or an inflatable tire with an inner tube.

In some embodiments, the drive assembly 120 can include one or more magnets, which are configured to provide additional support when rapid braking may be required. The additional rapid braking system can provide additional current coming from electromagnets 126 located outside of the rotor 122 and stator 124 to rapidly slow the rotor 122. Using the additional electromagnets 126 can allow the speed of the motion of the rotor 122 (and thus the tire 108) to be reduced much quicker than just built in electromagnets (between the rotor 122 and stator 124) responsible for acceleration and deceleration. With or without the use of the electromagnets 126, when using electric motors, the speed control and re-gen and braking can be determined by the power output from a controller (not depicted).

In some embodiments, the tire 108 and each of the propellers 110 can be individually powered to create a decentralized system. For example, there can three separate motors (i.e., stator rotor pairs) inside of the hubless propulsion units 100 to provide separately controlled rotation for each of the two separate propellers 110 (the first propeller 110a and second propeller 110b) and the tire 108. In some embodiments, each of the two separate propellers 110 and the tire 108 can have individual power to create a decentralized power network within each propulsion unit 100. For example, each of the rotatable elements of the propulsion unit 100 can have independent motors with independent power sources to provide individual power to each casing 102. The single or multiple power sources can be in each propulsion unit or located in a vehicle 700 coupled to the propulsion units for distributed across propulsion units 100. Alternatively, the vehicle 700 can include a single or multiple centralized power sources that work in combination to power all of the motors within each of the casings 102.

In some embodiments, power can be provided to the tire 108 and each of the propellers 110 in different combinations for different operations. For example, in some embodiments, both propellers 100 can be powered by one motor, and the tire 108 can be powered by a different motor. The motors (i.e., the stators) can be integrated into and/or coupled to the casing 102 using any combination of methods. For example, the motors can be held in place by the structurally reinforced portion of the casing 102 with grooves and recesses formed in the casing 102 for all of the motors. The power source and/or motors can include any combination of AC or DC systems known in the art.

Referring to FIGS. 4A and 4B, exploded views of the propulsion unit 100 in accordance with the present disclosure are depicted. The example embodiment provided in FIGS. 4A and 4B show a casing 102, a tire 108, a first propeller 110a, a drive assembly 120, and a second propeller 110b. The core of the propulsion unit 100 can be the three independent motors of the first propeller 110a, the second propeller 110b, and the drive assembly 120. Each of the propeller 110a, the second propeller 110b, and the drive assembly 120 include their own stator/rotor pairing such that they each have an independent motor. As discussed herein, the first propeller 110a and the second propeller 110b have a stator 112a on the outer ring with a rotor 112b in the inner ring while the drive assembly 120 has the rotor 122 on the out ring and ACTIVE 682125687v1 the stator 124 on the inner ring. The first propeller 110a and the second propeller 110b include blades 114 for generating lift and the drive assembly 120 is designed to couple with the tire 108 for generating a rotational force with the tire 108. For example, the rotor 122 of the drive assembly 120 can be coupled to or integrated with the tire 108. Each of these component can be assembled together within the casing 102 and the stators for the different motors can be coupled directly or indirectly to the casing 102 to provide a stationary structure.

Figure 5:
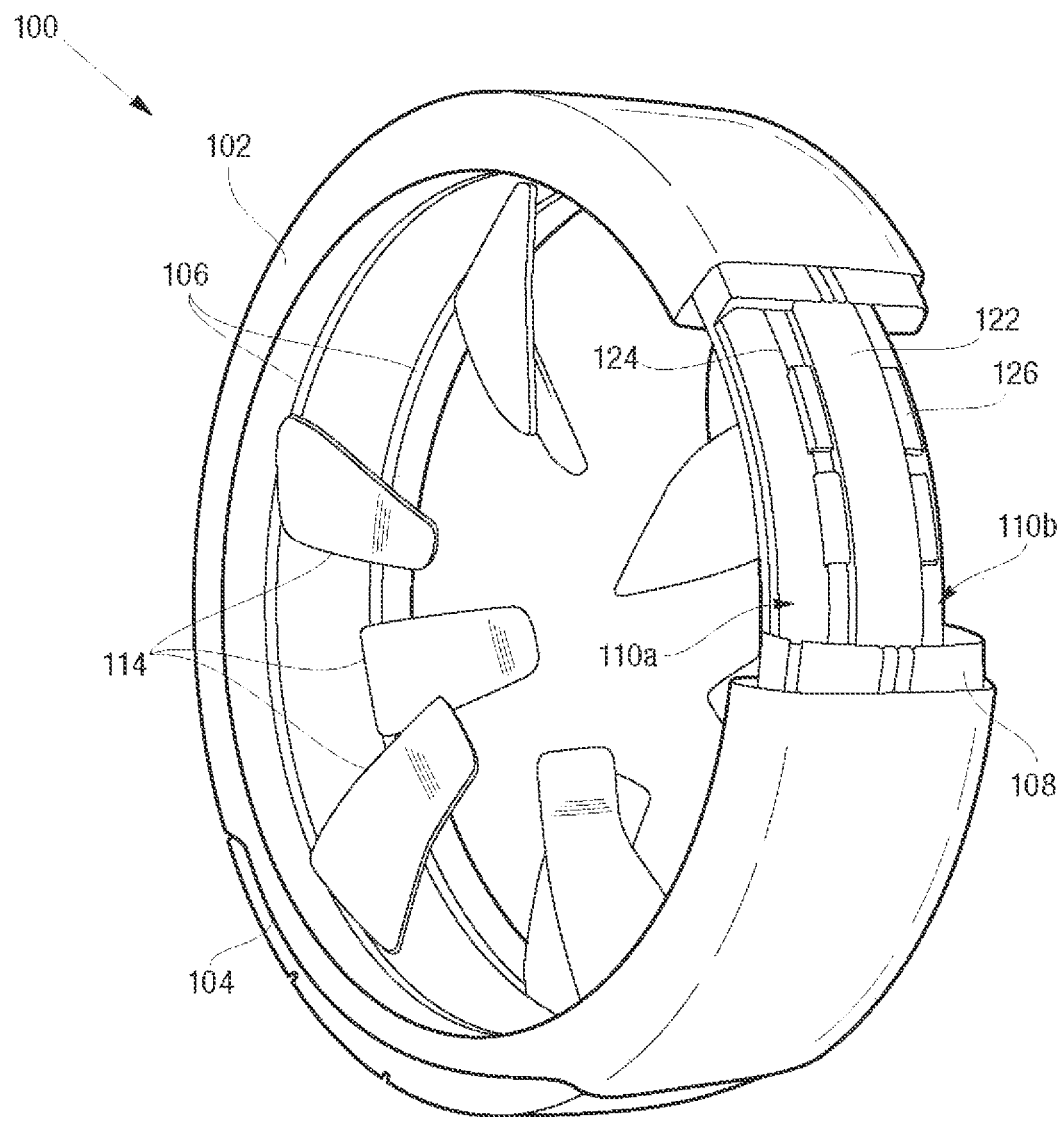
FIG. 5 is an isometric view of an example embodiment for a propulsion unit with a cross-sectional cutout, in accordance with the present disclosure.

Referring to FIG. 5, an exemplary isometric view of the proposition unit 100 with a cross-sectional cutout of the casing 102 and tire 108, showing the relationship of the assembled components is depicted. As shown in FIG. 5, each of the first propeller 110a, the second propeller 110b, and the drive assembly 120 can be assembled within the casing 102 to provide the three separate drive systems of rotating propellers 110 and tire 108. In some embodiments, the stators for the respective drive systems can be positioned proximate to one another with the stator 124 for the drive assembly being positioned substantially adjacent to the stators 112a of the propellers 110. The stators can be affixed to one another (while electrically separated) or separately coupled to the casing 102 such that they all remain stationary during operation. Similarly, the respective rotors can be enabled to rotate freely about the respective stators, for example, upon the application of an electrical current. In some embodiments, each of the propellers 110 can be located within the inner circumference of the tire 108 such that the tire 108 has a larger diameter than that of the propellers 110 and the distance between multiple propellers 110 is less than the width of the tire 108. In some embodiments, the positioning of the blades 114 of the different propellers 110 can be positioned such that they are offset from one another, for example, as shown in FIG. 1C.

In some embodiments the tire 108 can share a rotor/stator with one of the propellers 110. For example, there can be a single rotor/stator pair shared by both such that both the tire 108 a propeller 110 will spin together. In some embodiments, to reduce weight, cost, and/or complexity, at least one of the stators 112a, 124 can be designed to physically shift location to different rotors to provide a motion to one of the propellers 110 and/or the tire 108. For example, each of the propellers 110 can have a stator 112a and rotor 112b portion with at least one of the propellers having the capability to shift its stator 112a to be proximal to the rotor 122 for the tire 108. Shifting the stator 112a away from the propeller 110 to the tire 108 will change the rotational force being applied from the propeller 110 to the tire 108. In other words, the shift can be provided by a mechanism (e.g., push rod, control arm, cylinder, etc.) that physically moves the stator 112a from being substantially adjacent to the rotor 112b for a propeller 110 to being substantially adjacent to the rotor 122 for the tire 108. This would allow the same stator 112a to enable rotation of the different rotors 112b, 122, depending on its location.

Figure 6:
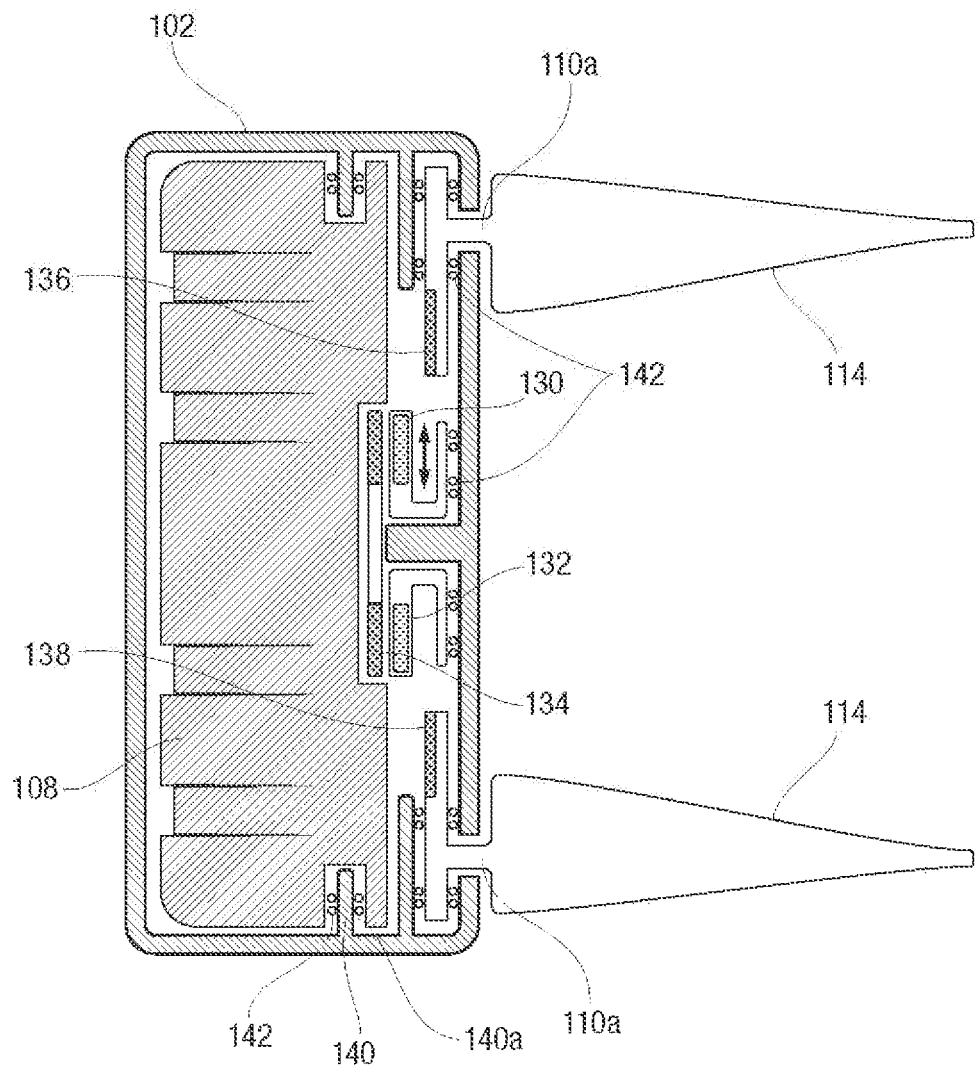
FIG. 6 is a cross-section side view of an example embodiment for a propulsion, in accordance with the present disclosure.

Referring to FIG. 6, in some embodiments, the propulsion unit 100 can be designed to move multiple stators. FIG. 6, shows a cross-sectional side view of an example the propulsion unit 100 with sliding stators 130, 132 that is switchable between rotors. In some embodiments, the sliding stators 130, 132 designed switchable couple to each of three rotors 134, 136, 138. The sliding stators 130, 132 and three rotors 134, 136, 138 can be similar in design and function as the stators 112a, 124 and rotors 112b, 122 discussed herein. For example, each of the three rotors 134, 136, 138 can be substantially ring shapes designed to provide rotational force to a different portion (i.e., tire 108, propellers 110a, 110b) of the propulsion unit 100. As shown in FIG. 6, the tire 108 can be coupled to a middle rotor 134, the first propeller 110a can be coupled to a rotor 136, and the second propeller 110b can be coupled to a rotor 138.

As shown in FIG. 6, in a first positioning, the sliding stators 130, 132 can be engaged with the rotor 134 coupled to the tire 108. With both of the stators 130, 132 positioned substantially adjacent to the rotor 134, power can be provided to cause rotation of the rotor 124 and thus the tire 108. In this configuration, the propulsion unit 100 will be operating in drive mode, as discussed in great detail herein. In some embodiments, the two stators 130, 132 can both be substantially adjacent to a single rotor 134 and the same current can be applied to each of the stators 130, 132 for uniform rotation of the tire. Although a single rotor 134 is shown, the tire 108 could include multiple rotors without departing from the scope of the present disclosure.

If it is desirable to transition the propulsion unit 100 from drive mode into fly mode, the positioning of the stators 130, 132 can be adjusted to change the power being applied to the tire 108 to the propellers 110a, 110b. To make this transition, the sliding stators 130, 132 may be moved from the first positioning to a second positioning. Initially, the transition can start with disengaging both of the stators 130, 132 from a locked stationary position with the casing 102, move laterally in opposing directions to be adjacent with the rotor 136 and the rotor 138 to re-engage with the casing 102 in a locked stationary position. Overall, the first position has the stators 130, 132 near the middle of the casing 102 for engaging with the tire 108 and the second position has the stators 130, 132 near the opposing ends of the casing 102 for engaging with the propellers 110a, 110b. Therefore, in operation, a sliding mechanism will move stators 130, 132 move outwards to power the propellers 110a, 110b and move stators 130, 132 to the middle to power the tire 108.

In the second positioning, the sliding stators 130, 132 can be engaged with the rotors 136, 138 coupled to the propellers 110a, 110b. With both of the stators 130, 132 positioned substantially adjacent to the rotors 136, 138, respectively, power can be provided to cause rotation of the rotor rotors 136, 138 and thus the tire propellers 110a, 110b. In some embodiments, different current can be applied to each of the stators 130, 132 to cause each of the rotors 136, 138 to rotate in opposing directions (counter rotating). In this configuration, the propulsion unit 100 will be operating in fly mode, as discussed in great detail herein.

Continuing with FIG. 6, in some embodiments, the propulsion unit 100 can include structural components to allow the rotors, tire 108, and the propellers 110 to rotate within the casing 102 while maintaining a substantially fixed path within the casing 102. The structural components can include a guide 140 designed to carry weight of tire 108 because stator and rotor incorporated within tire 108 have separation therebetween for their operation. In some embodiments, the tire 108 can include a recess 140a sized and shaped to receive the guide 104 extending from the casing 102. The guide 140 will provide the structure necessary to support the weight of the tire 108 during operation and while it is stationary. In some embodiments, the structural components can include a plurality of bearings 142 to assist in free moving rotation of the rotatable elements of the propulsion unit 100. For example, bearings 142 can be situated between the guide 140 and the recess 140a within the tire 108 to allow free movement of the tire 108 while maintaining support of the tire 108. The casing 102 can include bearings 124 at various locations within the propulsion unit 100, specifically, the bearings 124 can be provided at each of the rotors and their corresponding rotational element. For example, one or more bearings 124 can be provided between the propellers 110 and the casing 102, between the tire 108 and the casing, and between other lateral moving elements, such as the stators 130, 132.

The components of the propulsion unit 100 (or duct) can include any combination of materials known in the art. The materials should be a combination of high strength and light weight for most effective operation of a vehicle using the propulsion unit(s) 100. For example, the components can be made from any combination of plastic, rubber, steel plated aluminum, carbon fiber, tungsten, graphene, etc. Similarly, any combination of manufacturing methods can be implemented. For example, the techniques used to create these parts using any combination of injection molding, routing, casting, and three-dimensional printing.

Figure 7A:
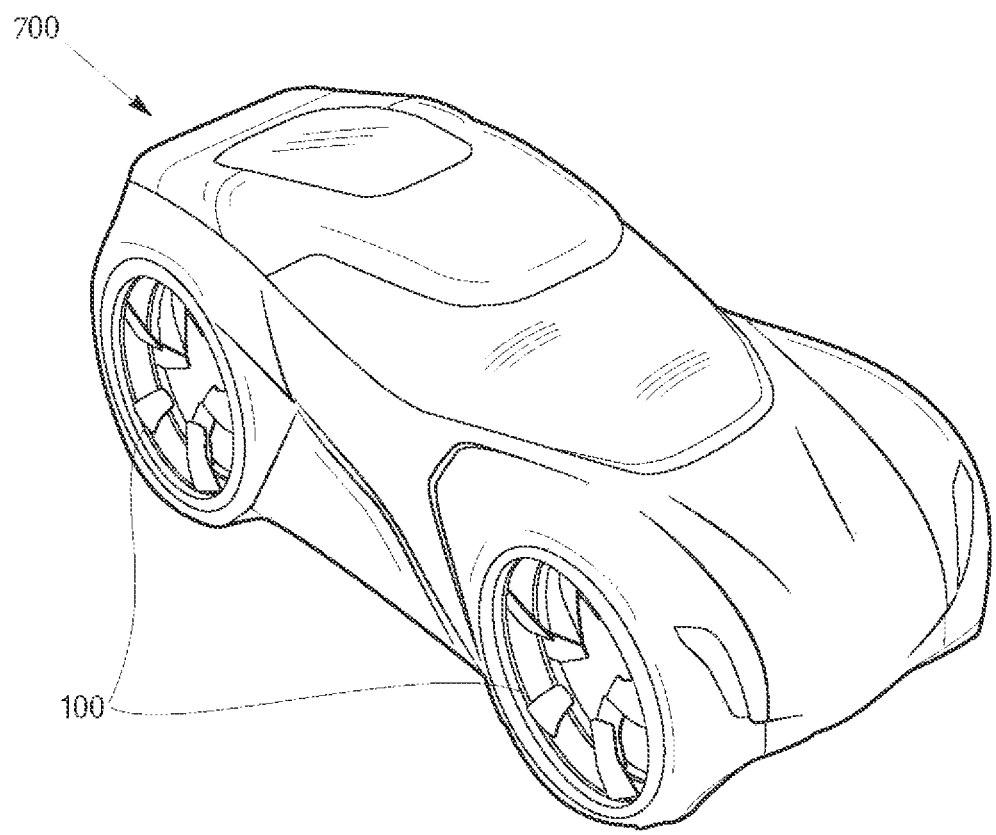
FIGS. 7A and 7B are example illustrations of vehicle utilizing the propulsion units of the present disclosure in a drive mode and a flight mode, in accordance with the present disclosure.
Figure 7B:
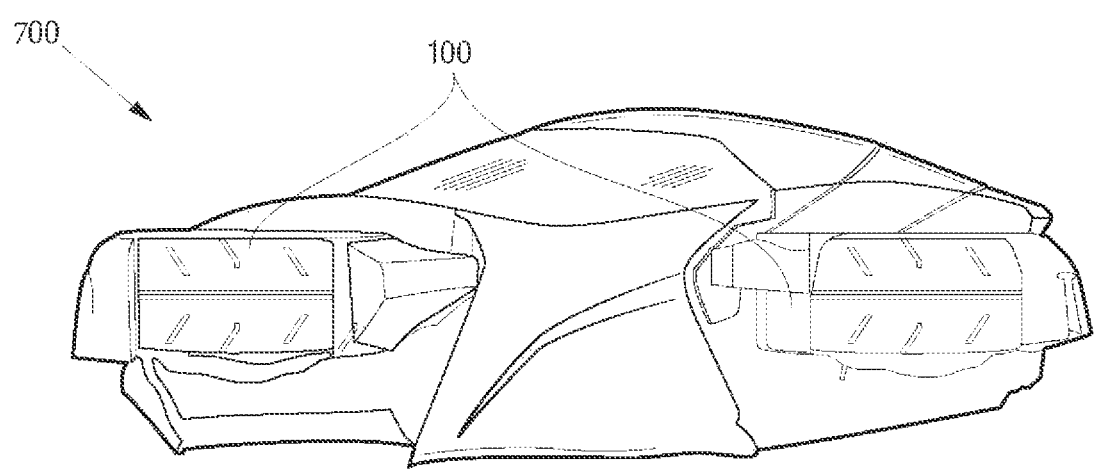

In operation, a controller can have an electric current transmitted, via an energy source, to the various motors (stator/rotor pair) to create rotation caused by the input occurring between the stator and the rotor. The controller can determine which of the motors to activate and in which direction. For example, the controller can activate motors associated with any of the propellers 110 or tire 108 within each of the propulsion units 100, depending on the driving mode. In some embodiments, multiple propulsion units 100 can be combined to be used within a vehicle to enable the vehicle to drive on roads or fly in the air. For example, as shown in FIGS. 7A-7B, the propulsion units 100 can pivot between a substantially vertical orientation during drive mode to a substantially horizontal orientation during flight mode. In the substantially vertical orientation, the motor (rotor 122, stator 124) associated with the tire 108 can be activated to propel the vehicle 700 on a road or other surface. In the substantially horizontal orientation, the motors (rotor 112b, stator 112a) associated with the propellers 110 can be activated to propel the vehicle 700 in the air. The different operations and transitioning between driving and flying can be performed using any combination of known mechanisms, for example, as discussed in U.S. application Ser. No. 17/174,660, incorporated herein in its entirety.

Referring to FIGS. 7A and 7B, in some embodiments, the propulsion units 100 can be implemented on a vehicle 700 to provide rotational forces to propel the vehicle 700. For example, the vehicle as discussed in U.S. application Ser. No. 17/174,660, incorporated herein in its entirety, can be designed to use the propulsion units 100 of the present disclosure. In some embodiments, the present disclosure discusses a transportation vehicle 600 configured for transforming between a drive mode and a flight mode. The vehicle 600 can includes a chassis with a body coupled thereto and a plurality of propulsion units 100, for example, as described above. The vehicle 600 can have a front end, a rear end, an undercarriage, and a roof, as depicted. The vehicle 600 of the present disclosure can include typical components as a convention automobile. For example, the body of the vehicle 600 can have a passenger side, a driver side, passenger side door(s), driver side door(s), and define an interior cabin, etc. Such vehicles 600 can also include conventional parts, such as a windscreen, a trunk or hatchback, windows, fenders, bumpers/facias, lights, etc. In some embodiments, the vehicle 600 can be sized and dimensioned to be approximately the size of any combination of vehicles, for example, a single passenger vehicle, a compact, a sedan, a couple, a sport utility vehicle (SUV), etc.

FIG. 7A shows an example of the vehicle 700 in drive mode in which the propulsion units are oriented in a substantially vertical orientation (e.g., as depicted in FIGS. 1A, 1C, and 5). FIG. 7B shows an example of the vehicle 700 in fly mode in which the propulsion units are oriented in a substantially horizontal orientation (e.g., as depicted in FIG. 1B). The vehicle 700 can include any combination of the propulsion units and any combination of configurations. For example, when in drive mode, the vehicle 700 can operate in all-wheel drive (i.e., all four propulsion units 100 powered) or two-wheel drive (i.e., two propulsion units 100 powered) whereas in fly mode the vehicle 700 can rotate all four pairs of the propellers 110. Similarly, each of the vehicle 700 modes can require different levels of force/power being applied to the different propulsion units 100.

In some embodiments, during a drive mode, the propulsion unit 100 may utilize the components of the drive assembly 120 to power and rotate the tie 108 to propel a vehicle 700 forward/backward on a surface. In one example, power can be supplied from a battery in a fuselage of the vehicle 700 to the motor for the drive assembly 120 built within the casing 102. The drive assembly 120 motor can have the stators/rotors configured to match requirements of the powertrain providing torque to the tire allowing the vehicle 700 to drive on surface as any other regular wheeled vehicle. The rotation speed can vary to manipulate the driving speed of the vehicle. In some embodiments, the rotations per minute (RPM) of the drive assembly 120 can be significantly lower than the RPM on the propellers 110 while having a higher torque rating. In some embodiments, when in drive mode, the rotors coupled to the tires 108 can be engaged with the stators to control acceleration, deceleration, and braking of the tires while the rotors for the propellers 110 can be locked in place or disengaged be allowed to be free-moving.

In some embodiments, during a flight mode, the propulsion unit 100 may utilize the components of the propellers 110 to enable flight of the vehicle. To enable flight, power can be supplied from a battery in a fuselage of the vehicle 700 to the motor for the propellers 110 built within the casing 102. Each of the propellers 110 can have their dedicated motor. In some embodiments, the vehicle 700 can include a controller for controlling which motors are powered and the amount of power provided by each of the motors to control rotation of the propellers 110/tires 108. Different control signals be sent to different components within the propulsion units 100 during the different modes. For example, when operating both propellers 110 in fly mode, the propellers 110 can be instructed by the controller to spin in opposite directions. Similarly, during fly mode, a middle motor (rotor 122) can be powered off to lock the tire in place during the flight. In contract, when in dive mode the middle motor can be powered to turn the tires 108 and the two outer motors (inner ring 112*b* rotor) powering propellers 110 can be locked in place, possibly freewheeling as the vehicle 700 drives on the ground. Vehicle 700 and propulsion units 100 can use any combination of stators/rotors configured to match requirements of powertrain providing torque to the propellers 110, allowing the vehicle 700 to generate light and take off vertically. In some embodiments, he RPM of the propellers can be significantly higher than the RPM of the drive assembly 120. The RPM required to take off and land can be approximately 4000 RPM. In some embodiments, when in fly mode, the rotors coupled to the propellers 110 can be engaged with the stators to control acceleration, deceleration, and braking of the propellers 110 while the rotors for the tires 108 can be locked in place or disengaged be allowed to be free-moving.

Although the present disclosure discusses using a stator/rotor motors, any combination of motors could be substituted within the propulsion unit 100 design without departing from the scope of the present disclosure. Similarly, the discus lore discusses a vehicle 600 that is designed to transaction between a drive mode and a fly mode using four propulsion units, however, any combination of vehicles, drive modes, and number of propulsion units 100 can be used without departing from the scope of the present disclosure.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the disclosure. It is intended that the present disclosure be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A propulsion unit comprising:
   a casing having an inner curved surface and an outer curved surface;
   at least one tire disposed within the casing radially within a duct defined by between the inner curved surface and the outer curved surface, wherein an opening is provided in the outer curved surface to permit the at least one tire to contact a driving surface;
   a first propeller and a second propeller having a plurality of blades extending from within the casing toward a center axis of the casing;
   one or more motors housed within the casing and including at least one stator, the one or more motors being configured to operate the at least one tire, the first propeller, and the second propeller independently of one another; and
   a sliding mechanism configured to slide the at least one stator between a first location to cause rotation of the at least one tire along in a driving mode and a second location to cause rotation of at least one of the first propeller and the second propeller in a fly mode, wherein the at least one stator is disengaged from a locked stationary position in the first location, the at least one stator is moved by the sliding mechanism, and the at least one stator is engaged to the locked stationary position in the second location.

2. The propulsion unit of claim 1, wherein the one or more motors comprise a first motor having:
  a first one of the at least one stator attached to the casing;
  a first rotor positioned around an outer circumference of the first one of the at least one stator; and
  the at least one tire being coupled to the first rotor.

3. The propulsion unit of claim 2, wherein the one or more motors comprise a second motor having:
  a second one of the at least one stator attached to the casing;
  a second rotor positioned within an inner circumference of the second one of the at least one stator; and
  a first set of the plurality of blades being coupled to the second rotor for the first propeller.

4. The propulsion unit of claim 3, wherein the one or more motors comprise a third motor having:
  a third one of the at least one stator attached to the casing;
  a third rotor positioned within an inner circumference of the third one of the at least one stator; and
  a second set of the plurality of blades being coupled to the third rotor for the second propeller.

5. The propulsion unit of claim 4, wherein the casing is configured to receive an electrical current and provide the electrical current to the first one of the at least one stator, the second one of the at least one stator, and the third one of the at least one stator to provide movement of the at least one tire, the first propeller, and the second propeller, respectively.

6. The propulsion unit of claim 2, wherein the first motor further comprises a plurality of electromagnets to provide assisted braking for the at least one tire.

7. The propulsion unit of claim 1, wherein the casing further comprises at least one runner gap for allowing the plurality of blades to protrude from within the casing.

8. The propulsion unit of claim 2, wherein the first motor with the at least one tire is configured for propelling a vehicle on a surface.

9. The propulsion unit of claim 4, wherein the second motor with the first propeller and the third motor with the second propeller are configured for propelling a vehicle in the air.

10. The propulsion unit of claim 1, wherein the first propeller and the second propeller are configured to rotate in opposite directions.

11. A propulsion unit comprising:
  a first rotor coupled to a plurality of blades extending toward a center axis of the first rotor,
  a second rotor a coupled to a tire;
  at least one stator designed to cause rotation of the first rotor or the second rotor;
  a casing for housing the first rotor, the second rotor, and the at least one stator; and
  a sliding mechanism configured to slide the at least one stator between a first location to cause rotation of the first rotor to cause rotation of the plurality of blades in a fly mode and a second location to cause rotation of the second rotor to cause rotation of the tire in a driving mode, wherein the at least one stator is disengaged from a locked stationary position in the first location, the at least one stator is moved by the sliding mechanism, and the at least one stator is engaged to the locked stationary position in the second location.

12. The propulsion unit of claim 11, wherein the at least one stator is designed to removably attach to the casing at the first location or the second location.

13. The propulsion unit of claim 11, further comprising a third rotor coupled to a second plurality of blades extending toward a center axis of the third rotor.

14. The propulsion unit of claim 11, wherein the casing further comprises at least one runner gap for allowing at least one blade of the plurality of blades to protrude from within the casing.

15. The propulsion unit of claim 11, wherein the second rotor further comprises a plurality of electromagnets to provide assisted braking for the tire.

16. A vehicle comprising:
  a chassis for receiving a passenger; and
  a propulsion unit comprising:
    a casing having an inner curved surface and an outer curved surface;
    at least one tire disposed within the casing radially within a duct defined by between the inner curved surface and the outer curved surface, wherein an opening is provided in the outer curved surface to permit the at least one tire to contact a driving surface;
    a first propeller and a second propeller having a plurality of blades extending from within the casing toward a center axis of the casing;
    one or more motors housed within the casing and including at least one stator, the one or more motors being configured to operate the at least one tire, the first propeller, and the second propeller independently of one another; and
    a sliding mechanism configured to slide the at least one stator between a first location to cause rotation of the at least one tire to propel the vehicle along the driving surface in a driving mode and a second location to cause rotation of the first propeller and the second propeller to create lift of the vehicle off the driving surface in a fly mode, wherein the at least one stator is disengaged from a locked stationary position in the first location, the at least one stator is moved by the sliding mechanism, and the at least one stator is engaged to the locked stationary position in the second location.

17. The vehicle of claim 16, wherein the one or more motors comprise a first motor having:
  a first one of the at least one stator attached to the casing;
  a first rotor positioned around an outer circumference of the first one of the at least one stator; and
  the at least one tire being coupled to the first rotor.

18. The vehicle of claim 17, wherein the one or more motors comprise a second motor having:
  a second one of the at least one stator attached to the casing;
  a second rotor positioned within an inner circumference of the second one of the at least one stator; and
  a first set of the plurality of blades being coupled to the second rotor for the first propeller.

19. The vehicle of claim 18, wherein the one or more motors comprise a third motor having:
  a third one of the at least one stator attached to the casing;
  a third rotor positioned within an inner circumference of the third one of the at least one stator; and
  a second set of the plurality of blades being coupled to the third rotor for the second propeller.

20. The vehicle of claim 19, wherein the casing is configured to receive an electrical current and provide the electrical current to the first one of the at least one stator, the second one of the at least one stator, and the third one of the at least one stator to provide movement of the at least one tire, the first propeller, and the second propeller, respectively.

21. The vehicle of claim 17, wherein the first motor further comprises a plurality of electromagnets to provide assisted braking for the at least one tire.

22. The vehicle of claim 16, wherein the casing further comprises at least one runner gap for allowing the plurality of blades to protrude from within the casing.

23. The vehicle of claim 17, wherein the first motor with the at least one tire is configured for propelling the vehicle on a surface.

24. The vehicle of claim 19, wherein the second motor with the first propeller and the third motor with the second propeller are configured for propelling the vehicle in the air.

25. The vehicle of claim 16, wherein the first propeller and the second propeller are configured to rotate in opposite directions.

26. The propulsion unit of claim 6,
wherein the plurality of electromagnets are disposed radially outward of the first one of the at least one stator and the first rotor, and
wherein the plurality of electromagnets provide added current to rapidly slow the at least one tire.

27. The propulsion unit of claim 15,
wherein the plurality of electromagnets are disposed radially outward of the at least one stator and the second rotor, and
wherein the plurality of electromagnets provide added current to rapidly slow the tire.

28. The vehicle of claim 21,
wherein the plurality of electromagnets are disposed radially outward of the first one of the at least one stator and the first rotor, and
wherein the plurality of electromagnets provide added current to rapidly slow the at least one tire.

29. The propulsion unit of claim 1, wherein in the first location the at least one stator is disposed near a middle of the casing and in the second location the at least one stator is disposed near an end.

30. The propulsion unit of claim 1, wherein in the driving mode the at least one stator is configured to cause rotation of the at least one tire to propel the at least one tire along the driving surface and in the fly mode the rotation of at least one of the first propeller and the second propeller is configured to create lift off the driving surface.

* * * * *